US008972929B2

(12) United States Patent
Fahmy

(10) Patent No.: US 8,972,929 B2
(45) Date of Patent: Mar. 3, 2015

(54) GENERIC USER INPUT FOR GUI FRAMEWORK

(75) Inventor: Hesham Fahmy, Etobicoke (CA)

(73) Assignee: International Business Machines Corporation, Armonk, NY (US)

( * ) Notice: Subject to any disclaimer, the term of this patent is extended or adjusted under 35 U.S.C. 154(b) by 2072 days.

(21) Appl. No.: 10/907,423

(22) Filed: Mar. 31, 2005

(65) Prior Publication Data

US 2006/0230348 A1  Oct. 12, 2006

(51) Int. Cl.
*G06F 9/44* (2006.01)
(52) U.S. Cl.
CPC ................................. *G06F 9/4443* (2013.01)
USPC ........... 717/107; 717/109; 717/106; 717/110; 717/111; 717/113

(58) Field of Classification Search
None
See application file for complete search history.

(56) References Cited

U.S. PATENT DOCUMENTS

| 5,228,123 | A | * | 7/1993 | Heckel | 715/762 |
|---|---|---|---|---|---|
| 5,467,472 | A | * | 11/1995 | Williams et al. | 707/1 |
| 5,642,511 | A | * | 6/1997 | Chow et al. | 717/105 |
| 5,822,520 | A | * | 10/1998 | Parker | 709/230 |
| 5,870,088 | A | * | 2/1999 | Washington et al. | 715/781 |
| 5,872,974 | A | * | 2/1999 | Mezick | 717/109 |
| 5,929,851 | A | * | 7/1999 | Donnelly | 715/762 |
| 5,950,001 | A | * | 9/1999 | Hamilton et al. | 717/110 |
| 5,991,534 | A | * | 11/1999 | Hamilton et al. | 717/111 |
| 6,049,805 | A | * | 4/2000 | Drucker et al. | 707/102 |
| 6,059,838 | A | * | 5/2000 | Fraley et al. | 717/108 |
| 6,100,885 | A | * | 8/2000 | Donnelly et al. | 715/762 |
| 6,237,135 | B1 | * | 5/2001 | Timbol | 717/107 |
| 6,784,883 | B1 | * | 8/2004 | Allor | 345/419 |
| 2003/0069969 | A1 | | 4/2003 | Renaud | |
| 2003/0112275 | A1 | | 6/2003 | Proulx et al. | |

FOREIGN PATENT DOCUMENTS

WO   WO9960478   11/1999

OTHER PUBLICATIONS

Dolman, L. "Visual Ada Developer", 2002, ACM, p. 30-34.*
Green, T. "Verdantium Towards a Java-Enabled Compound Document Model", 2000, ACM, p. 77-78.*

* cited by examiner

*Primary Examiner* — Qamrun Nahar
(74) *Attorney, Agent, or Firm* — Steven M. Greenberg, Esq; CRGO Law

(57) ABSTRACT

A graphical user interface (GUI) environment that can consume generic property descriptions from a third party and generate visual properties to an end user based on a set of interface definitions, wherein said interface definitions include: a property descriptor interface that provides a root interface for a description of any visual property defined by the third party; a property change listener interface that defines a notification listener to listen to specialized property change events; a property interface that defines a visual property having a value that can be set; a property group interface for defining a logical grouping of properties; and a property type interface.

12 Claims, 6 Drawing Sheets

FIG. 2A

Customer Information
?:        To process the order we need the customer information details
Salutation:    |Mr.                                                    ▼|
First Name:  * |                                                        |
Last Name:   * |                                                        |
Street Address:* |                                                  / 64|
☐ Would you like to recieve promotional emails?
Purchase Order Details
?:        To process the order we need the product details
Product:    |                                                        ▼|
Quantity:   |                                                          |
Price:      $0

FIG. 3

Customer Information
?:        To process the order we need the customer information details
Salutation:    |Mr.                                                    ▼|
First Name:  * |Mr.                                                     |
               |Ms.                                                     |
               |Mrs.                                                  — 66|
Last Name:   * |                                                        |
Street Address:* |                                                      |
☐ Would you like to recieve promotional emails?
Purchase Order Details
?:        To process the order we need the product details
Product:    |                                                    ▼| — 64
Quantity:   |                                                          |
Price:      $0

FIG. 4

Customer Information
?:          To process the order we need the customer information details
Salutation:     Mr.
First Name:   * John
Last Name:    * Smith
Street Address:* 123 Some Street                                    \ 64
☑ Would you like to recieve promotional emails?
Purchase Order Details
?:          To process the order we need the product details
Product:      * |
              Product 1
Quantity:     * Product 2
Price:        $0

FIG. 7

Customer Information
?:          To process the order we need the customer information details
Salutation:     Mr.
First Name:   * John                                                 / 64
Last Name:    * Smith
Street Address:* 123 Some Street
☑ Would you like to recieve promotional emails?
Purchase Order Details
?:          To process the order we need the product details
Product:      * Product 1
Quantity:     * 1
Price:        $10

FIG. 8

GENERIC USER INPUT FOR GUI FRAMEWORK

TECHNICAL FIELD

The present invention relates generally to software frameworks, and more specifically relates to a system and method for allowing a generic user input contribution to a software framework.

RELATED ART

In software frameworks, it is common for third parties to provide functionality that plugs into the existing capabilities of the base environment. This functionality typically requires some user input, and thus forces the third party to implement a graphical user interface (GUI) contribution that conforms to the GUI application programming interface (API) provided by the environment of the software framework.

Third parties typically want to plug their functionality into multiple software environments. Illustrative software environments may, for example, include different operating systems or devices such as mobile phones, handheld devices and desktop computers. In order to accomplish this, the third party must write a separate GUI contribution based on each environment's GUI API. This can be prohibitive due to the time and costs involved in learning each different API and related layout restrictions, and developing and maintaining the necessary code for each.

One solution to the problem involves implementing a declarative GUI environment, such as those provided by TCL/TK, HTML/XHTML forms, and XFORMS. Unfortunately, all of these technologies require the provider of the GUI declaration to define the actual GUI controls that are desired. For example, the provider may be required to declare that a certain visual property requires a text field while other visual properties require radio buttons, etc. The problem with this approach is that not all environments render GUIs in the same form. Also, in certain environments, GUI controls and layouts may be restricted by the capabilities and usability of the target hardware. For example, certain GUI layouts are not functional on mobile phones due to the small screen size, and lack of a pointing device such as a mouse. Thus, a provider using any of these GUI technologies must factor in detailed considerations about the usability of the GUI being declared, the nature of the GUI controls, and layouts being used. In many cases, this area of knowledge is not in the provider's area of expertise. Instead, the provider is experienced in knowing what properties are required from the user in order to perform a particular task. Hence, it is desirable to have a framework whereby third parties can simply define the nature of the user input required, and delegate the presentation of the GUI interface to the underlying software environment.

The base Java Development Kit (JDK) java.beans defines a PropertyDescriptor class and APIs to describe the properties of a JavaBean. However these APIs are limited in the following areas: (1) PropertyDescriptors do not provide detailed information, such as: whether a visual property is required or optional, whether the visual property is a sensitive field such as a password, whether the visual property is enabled or disabled for any reason, etc. (2) PropertyDescriptors can only describe properties of a JavaBean. They cannot be used to describe a stand-alone set of properties. (3) Property Change Notification only notifies if the value of a visual property was changed (e.g., by a user setting a value). However, there is no support for notifying if a visual property is enabled or disabled. In addition, there is no notification if the set of enumerated valid values of the visual property have changed. (4) PropertyDescriptors cannot be logically grouped together. They are only grouped as one set of PropertyDescriptors per JavaBean. However, it would be useful if one could define sub groupings of these descriptors such that similar properties are grouped together. For example, a JavaBean with connection properties may be more meaningful if the username and password properties were grouped together separate from the connection attribute properties. (5) PropertyDescriptors cannot model multi-typed properties such as a union or a table.

Accordingly, a need exists for a framework that provides the basic premise of the java.beans.PropertyDescriptor, but also provides enhancements to address the limitations noted above.

SUMMARY OF THE INVENTION

The present invention addresses the above-mentioned problems, as well as others, by providing a framework by which third parties can define required visual properties in a generic form. This generic form contains no information on how the visual properties should look (e.g., should they be radio buttons or combo boxes?). Instead, the form of the input from the third party is limited to containing rich information on the nature and behavior of the properties required. This framework provides a GUI environment with sufficient information to make intelligent decisions on how to render the visual properties, and how to layout all of the visual properties in a GUI.

Thus, any GUI environment can be constructed to consume a generic set of property definitions and render the visual properties to an end user in a form determined by the particular environment's GUI layer. This thus allows third parties to focus on the logic of the user information required, and allows them to plug in their functionality into multiple environments without having to write, and re-write, GUI implementation code.

In a first aspect, the invention provides a user interface environment that can consume generic property descriptions from a third party and generate visual properties to an end user based on a set of interface definitions, wherein said interface definitions comprise: a property descriptor interface that provides a root interface for a description of any visual property defined by the third party; a property change listener interface that defines a notification listener to listen to specialized property change events; a property interface that defines a visual property having a value that can be set; a property group interface for defining a logical grouping of visual properties; and a property type interface.

In a second aspect, the invention provides a program product stored on a computer readable medium for implementing a user interface environment that can consume generic property descriptions from a third party and generate visual properties to an end user based on a set of interface definitions, wherein said interface definitions comprise: a property descriptor interface that provides a root interface for a description of any visual property defined by the third party; a property change listener interface that defines a notification listener to listen to specialized property change events; a property interface that defines a visual property having a value that can be set; a property group interface the defines a logical grouping of visual properties; and a property type interface.

In a third aspect, the invention provides a method of implementing a user interface environment that can consume generic property descriptions from a third party and graphically display visual properties to an end user, comprising:

providing a set of environment independent interface definitions, comprising: a property descriptor interface that provides a root interface for a description of any visual property defined by the third party, a property change listener interface that defines a notification listener to listen to specialized property change events, a property interface that defines a visual property having a value that can be set, a property group interface the defines a logical grouping of visual properties, and a property type interface; inputting a set of property definitions from a third party that conform to the environment independent interface definitions; processing the set of property definitions; and graphically displaying visual properties based on the set of property definitions.

In a fourth aspect, the invention provides a method for deploying an application for graphically displaying visual properties, comprising: providing a computer infrastructure being operable to: implement a user interface environment that graphically displays third party properties to an end user based on a set of interface definitions, wherein said interface definitions include a property descriptor interface, a property change listener interface, a property interface, a property group interface the defines a logical grouping of properties, and a property type interface; input a set of property definitions from a third party that conform to the set of interface definitions; process the set of property definitions; and graphically display properties based on the set of property definitions.

In a fifth aspect, the invention provides computer software embodied in a propagated signal for graphically displaying visual properties, the computer software comprising instructions to cause a computer to perform the following functions: implement a user interface environment that graphically displays third party properties to an end user based on a set of interface definitions, wherein said interface definitions include a property descriptor interface, a property change listener interface, a property interface, a property group interface the defines a logical grouping of properties, and a property type interface; input a set of property definitions from a third party that conform to the et of interface definitions; process the set of property definitions; and graphically display properties based on the set of property definitions.

BRIEF DESCRIPTION OF THE DRAWINGS

These and other features of this invention will be more readily understood from the following detailed description of the various aspects of the invention taken in conjunction with the accompanying drawings in which:

FIGS. 2A and 2B depict a set of interface definitions for the GUI environment of FIG. 1 in accordance with the present invention.

FIGS. 3-8 depict an example of a series of visual interface properties generated using the interface definition of FIGS. 2A and 2B, in accordance with the present invention.

DETAILED DESCRIPTION OF THE INVENTION

Figure 1:
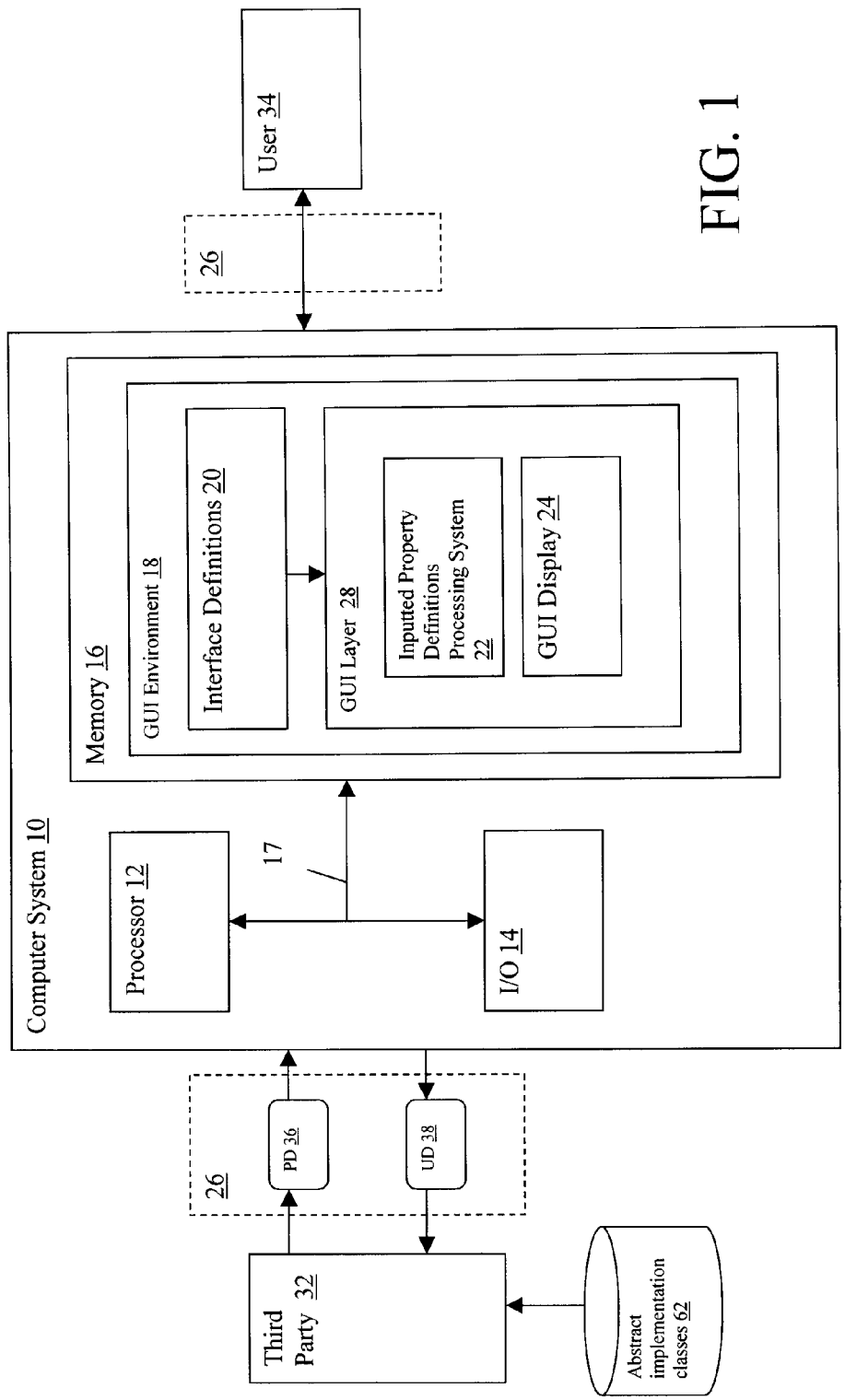
FIG. 1 depicts a computer system for implementing a GUI environment in accordance with the present invention.

Referring now to the drawings, FIG. 1 depicts a computer system 10 having a GUI (graphical user interface) environment 18 capable of receiving plug-ins from a third party 32 that can be displayed to a user 34. GUI environment 18 includes a set of interface definitions 20 that allows third party 32 to submit generic property definitions (PD) 36 that are independent of the GUI environment 18. Thus, the same property definitions 36 could be submitted by the third party 32 to different types of GUI environments (e.g., a PC, a handheld device, etc.) for display without modification. The interface definitions 20 utilized by each such GUI environment 18 are described in further detail below with respect to FIGS. 2A and 2B. It is understood that the terms "visual properties" and "properties" are used interchangeably throughout this document to describe how information is to be displayed within an environment. It is also understood that while the invention is described with reference to a GUI environment, the invention may also apply to non-graphical environments, such as a command prompt driven environment.

GUI environment 18 includes a GUI layer 28 that provides an inputted property definitions processing system 22 that processes the inputted property definitions 36 and determines how to render the visual properties. Once the inputted property definitions 36 are processed, GUI display 24 displays the visual properties to user 34 over network 26. User 34 can then enter user data (UD) 38 that is returned to third party 32. An example of this process is described below with reference to FIGS. 3-8.

In general, computer system 10 may comprise, e.g., a desktop, a laptop, a workstation, handheld device, etc. Moreover, computer system 10 could be implemented as part of a client and/or a server. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network 26 such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

Figure 2A:
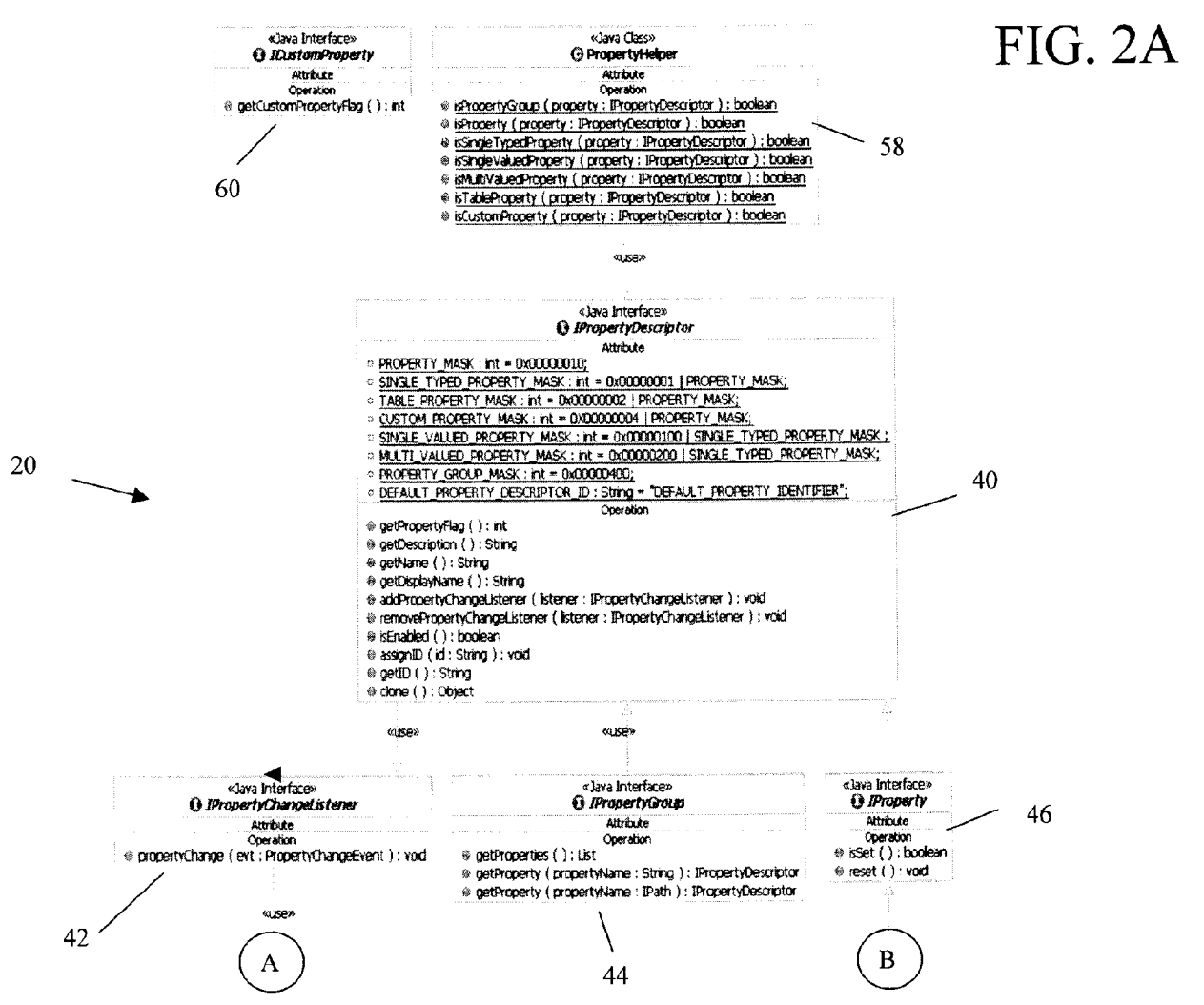
Figure 2B:
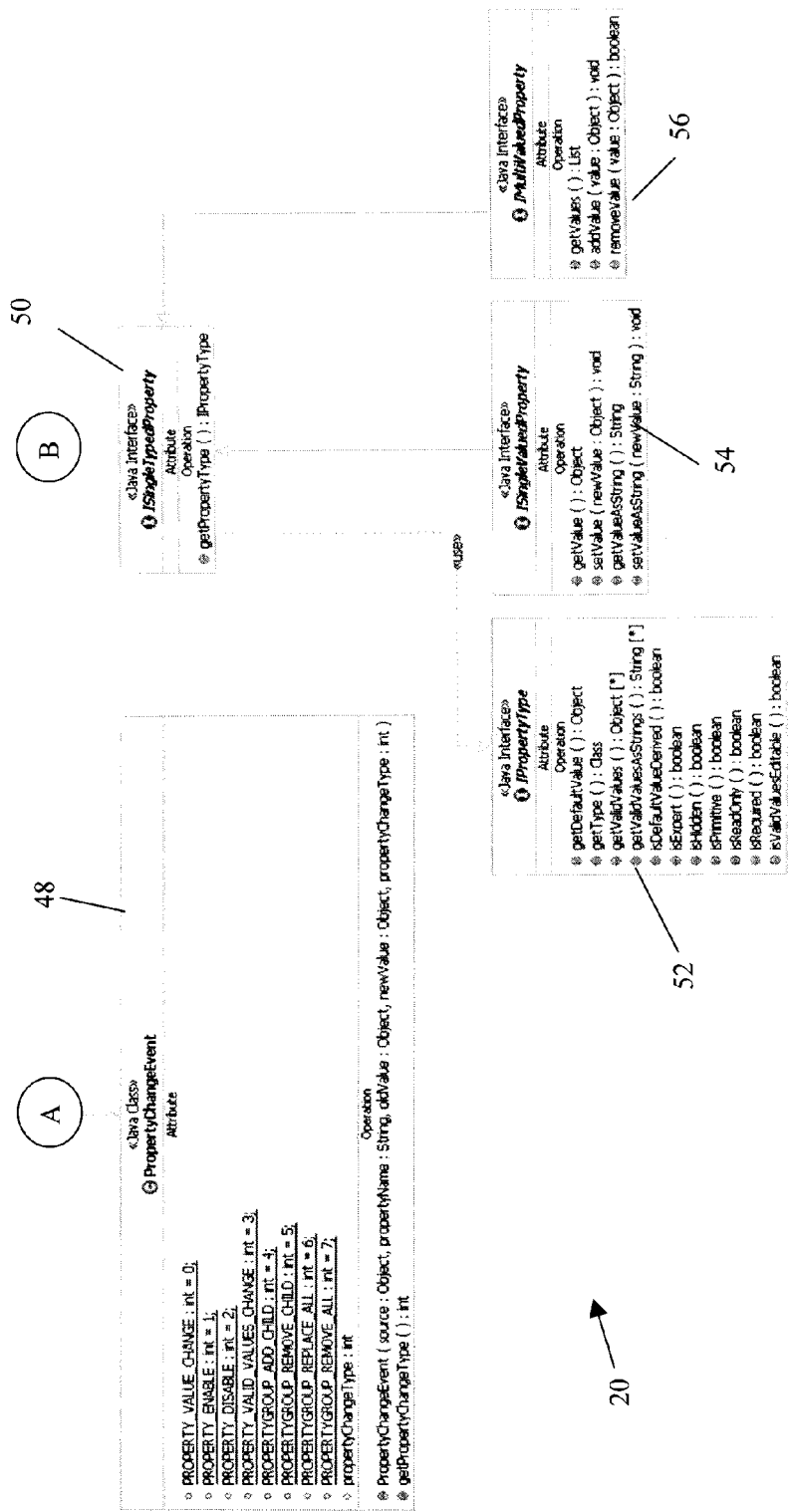

Referring now to FIGS. 2A and 2B, a Java based hierarchical representation of a set of interface definitions 20 that defines a set of application programming interfaces (APIs) are shown. Property descriptor interface 40, entitled IPropertyDescriptor, acts as the root interface for the APIs and provides a description of any visual property. Property descriptor interface 40 includes attributes to define: (1) the name of the visual property; (2) the display name of the visual property (to be used when displaying in the GUI); (3) the description of the visual property; (4) an identifier to indicate if the visual property is enabled or disabled; and (5) a bit flag to be used to quickly identify the property type of the descriptor (e.g., by doing a bitwise comparison with predefined bit masks). It also includes methods to add and remove notification listeners who wish to listen to changes made on the visual property. It is also possible to add and remove java.bean.VetoableChangeListeners to the property descriptor interface 40. This would typically be done by property providers to provide constraints and validation on the values set on a particular visual property. Defined above property descriptor interface 40 is a property helper class 58 and custom property interface 60.

Below property descriptor interface 40 are three additional interfaces, including a property change listener interface 42, a property group interface 44, and a property interface 46. Property change listener interface 42, entitled IPropertyChangeListener defines a notification listener, and is very similar to the notification change listener defined in the java.beans package. However, this listener is customized to listen to specialized property change events. A property change event class 48, entitled PropertyChangeEvent, is defined below property change listener interface 42. This class 48 defines a customized event that is similar to the java.beans change event. However, this event supports notification of the following cases: (1) If a property's value has changed; (2) If a property has been enabled or disabled; (3) If a property's set of enumerated valid values has changed; (4) If a property group had a child property added or removed; and (5) If a property group had all of its contents replaced or removed.

Property group interface 44, entitled IPropertyGroup, defines a logical grouping of visual properties. It is composed of an aggregate of property descriptors. This means that a grouping of properties can support nested groupings of properties. The property group interface 46 supports the retrieval of one of the properties contained within a property group, using a string that represents the path to the contained property.

The property interface 46, entitled IProperty, represents an actual visual property that has a value that can be set and retrieved. The property interface 46 defines a flag that indicates if the value of the visual property has been set, and it also includes a method that resets the value to the visual properties initial, or default, state.

Below property interface 46 is a single typed property interface 50 entitled, ISingleTypedProperty, which represents a visual property that has only one type. This is the most common form of a visual property. (For example, a user name property is a property with only one type, i.e., a string.) Hence, the single typed property is associated with only one property type. It is possible to have other interfaces that represent types with multiple types, such as unions or data tables. Such interfaces would be associated with multiple property types.

The property type interface 52, entitled IPropertyType, defines the complete description of the information a visual property is representing. The GUI layer 28 is expected to use the information captured in this interface 52 as the primary source of information that influences the way GUI layer 28 will render the visual property. The property type interface 52 includes attributes for: (1) the underlying Java type that the property represents; (2) a flag indicating if the property value is a hidden one that should not be displayed in a GUI (such as a sensitive field such as a password); (3) a flag indicating if the property is a read only property, meaning that a user cannot set a value on it; (4) a flag indicating if the property is considered one to be used by advanced users; (5) a GUI layer 28 that can use this information to hide the property unless the user is considered an advanced user; (6) a flag to indicate if the property represents a primitive Java type; (7) a flag to indicate if the property is a required one, meaning that a user must set a value for it; (8) a default value for the property; and (9) an enumeration of valid property values, if such an enumeration exists.

The singled valued property interface 54, entitled ISingleValuedProperty, represents a single typed property that can only hold one value. This is the most common type of property. The multi valued property interface 56, entitled IMultiValuedProperty, represents a single typed property that can hold multiple values, such as an array or a list.

Using the interfaces described above, GUI layer 28 can be easily written for various software environments. GUI layer 28 would be able to consume a set of property descriptors, and from this set render a meaningful GUI. Thus, third party 32 need only provide an implementation of these interfaces for their particular properties. These implementations would then be portable across any software environment that supported a GUI layer 28 that consumes these interfaces.

One method for implementing this invention is to provide a set of abstract implementation classes 62 (see, FIG. 1) for each of the interfaces described above. These abstract implementation classes 62 would include all the core logic for the basic behavior of the interfaces, and thus allow third party property providers to simply sub-class the implementations and only provide the specific details of the property behavior required.

Next, an example of the use of property descriptors in accordance with present invention is provided. Assume third party 32 needs to collect the following information from the user 34 to process a purchase order: (1) the first name, last name and street address of the customer; and (2) whether the customer would like to be included on the promotional email list. Once the customer information above is entered (and only if it has been entered), the product being ordered, the quantity of the product, and the price of the product needs to be shown to the user.

With these requirements, third party 32 can describe the visual properties as follows:

1. Define an IPropertyGroup called "Customer Information" to hold the customer information properties. The initial state of this property group and all its sub properties are enabled.

2. Add a Read-Only String ISingleValuedProperty that contains the following text value: "To process the order we need the customer information details," and set the description of the property to be "Please enter the desired salutation."

3. Add a String ISingleValuedProperty that has a set of enumerated valid values defined as "Mr., Ms. & Mrs." (i.e., the only values that can be entered are "Mr., Ms. & Mrs.").

4. Add a String ISingleValuedProperty with the display name "First Name." Set the description of the property to be "The Customer's first name."

5. Add a String ISingleValuedProperty with the display name "Last Name." Set the description of the property to be "The Customer's last name."

6. Add a String ISingleValuedProperty with the display name "Street Address." Set the description of the property to be "The Customer's Street Address."

7. Add a Boolean ISingleValuedProperty with the display name "Would you like to receive promotional emails?" Set the description of the property to be "Indicate if you would like to receive promotional email."

8. Define an IPropertyGroup called "Purchase Order Details" to hold the product order properties. Set the initial state of this IPropertyGroup to be disabled (i.e., isEnabled( ) returns false). Make this IPropertyGroup be a PropertyChangeListener on the First Name property from above. Being a listener, when it gets notified that the value of the First Name property has changed it should set the Purchase Order IPropertyGroup into the enabled state if the First Name holds a valid value (e.g., not an empty string, etc.)

9. Add a String ISingleValuedProperty that has a set of valid values defined as "Product 1. & Product 2." Give this property the display name "Product" and make its valid values fixed (e.g., the only values that can be entered are Product 1 or Product 2). Set the description of the property to be "Select the product to order."

10. Add an Integer ISingleValuedProperty with the display name "Quantity." Set the description of the property to be "Specify the quantity of the product you desire."

11. Add a String ISingleValuedProperty with the display name "Price." Set the description of the property to be "This is the unit price for the selected product." Set this as a read only property (i.e., the user cannot manually change the value of the property). Make this property register itself as a propertyChangeListener on the "Product" property. When it gets notified of changes in the value of the "Product" property, it should change its own value to reflect the current product set in the "Product" property.

12. Create one top level IPropertyGroup that contains the two IPropertyGroups defined above.

By defining the desired properties as shown above, enough description and behavior is provided that allows the described GUI environment to present a necessary set of interfaces to the user 34 for user input. An example of how this would be rendered is described in FIGS. 3-8, which shows different states of a dialog box 64.

As can be seen in FIG. 3, an initial state of dialog box 64 is shown having various fields for displaying and collecting information to and from the user 34. Note how the two sub IPropertyGroups "Customer Information" and "Purchase Order Details" group together the relevant properties. Also note how the "Purchase Order Details" are disabled because that is their initial state and nothing was entered for a customer first name.

FIG. 4 shows a drop down menu 66 for the set of defined salutations. Because a set of valid values was specified, the interface is rendered to restrict the selection to those values (i.e., the salutation property).

Figure 5:
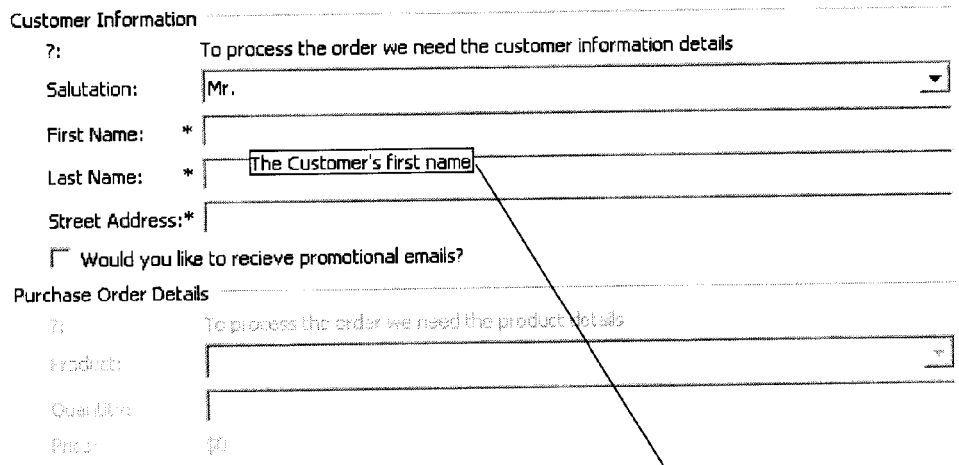

As shown in FIG. 5, it can be seen that the Display Name for each visual property is used as a label, and that the description can also be displayed. In this illustrative embodiment, the description is displayed as a "hover" help 68 when the user 34 puts the cursor/mouse on a given field.

Figure 6:
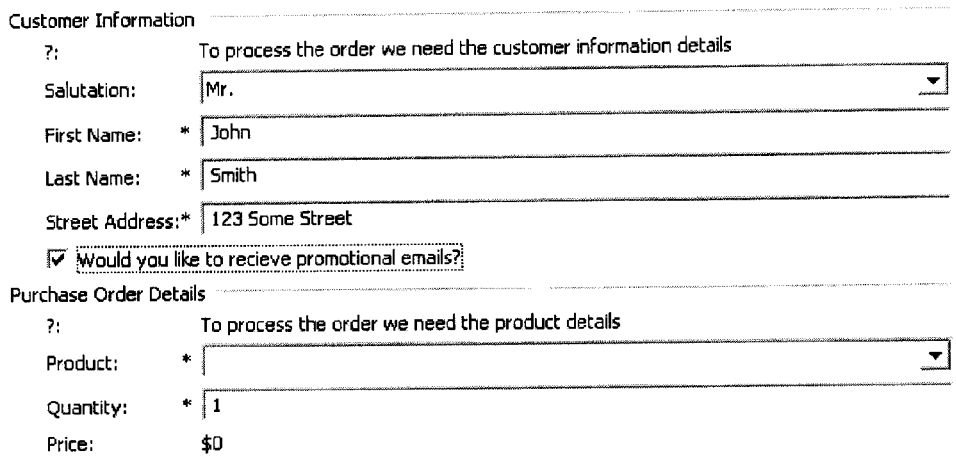

In FIG. 6, it is seen that the Purchase Order Details are now enabled since the first name field was filled with a value. This occurs because the IPropertyGroup was listening for changes in the first name field.

In FIGS. 7 and 8, it can be seen that the value of the "Price" field changes as a result of a selection of a Product. Also note how the Price is rendered differently because it was described as a read only property.

Obviously, the above example illustrates one of many possible ways that GUI layer 28 might implement and display the visual properties defined by the third party 32.

It should also be appreciated that the teachings of the present invention could be offered as a business method on a subscription or fee basis. For example, a computer system 10 comprising GUI environment 18 and/or abstract implementation classes 62 could be created, maintained and/or deployed by a service provider that offers the functions described herein for customers. That is, a service provider could offer to provide a GUI environment 18 or the third party property definitions 62 as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form. Accordingly, while the invention is described herein as being implemented in a Java programming environment, it should be understood that the invention could be implemented in other environments.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A user interface (UI) environment stored on a computer device for consuming generic property descriptions from a third party and generating visual properties to an end user based on a set of interface definitions, wherein said set of interface definitions comprise:

a property descriptor interface for providing a root interface for a description of any environment independent visual property defined by the third party, wherein the property descriptor interface includes attributes to define: a name of the visual property, a display name of the visual property, a description of the visual property, an identifier to indicate whether the visual property is enabled, and a bit flag for identifying a visual property type by doing a bitwise comparison with predefined bit masks, the visual property describing how information is displayed and being at least one of a property of a visual element of a graphical user interface or a parameter associated with the visual element of the graphical user interface;

a property change listener interface for defining a notification listener to listen to specialized property change events;

a property interface for defining the visual property having a value that can be set, wherein the property interface defines a first flag that indicates whether the value of the visual property has been set, and further includes a system for resetting the value of the visual property;

a property group interface for defining a logical grouping of visual properties, the property group interface including an aggregate of property descriptors; and a property type interface, wherein the property type interface includes attributes selected from the group consisting of:

an underlying Java type that the visual property represents;
a second flag indicating whether the visual property is a hidden property;
a third flag indicating whether the visual property is a read-only property;
a fourth flag indicating whether the end user is an advanced user;
a fifth flag indicating whether the visual property represent a primitive Java type;
a sixth flag indicating whether the visual property is a required property;
a seventh flag indicating whether the visual property is a sensitive property;
a default value for the visual property; and
an enumeration of valid visual property values.

2. A program product stored on a computer readable storage medium for implementing a user interface environment for consuming generic property descriptions from a third party and generating visual properties to an end user based on a set of interface definitions, wherein said set of interface definitions comprise computer readable program code for defining:

a property descriptor interface for providing a root interface for a description of any environment independent visual property defined by the third party, wherein the property descriptor interface includes attributes to define: a name of the visual property, a display name of the visual property, a description of the visual property, an identifier to indicate whether the visual property is enabled, and a bit flag for identifying a property type by doing a bitwise comparison with predefined bit masks, the visual property describing how information is displayed and being at least one of a property of a visual element of a graphical user interface or a parameter associated with the visual element of the graphical user interface;

a property change listener interface for defining a notification listener to listen to specialized property change events;

a property interface for defining the visual property having a value that can be set, wherein the property interface defines a first flag that indicates whether the value of the visual property has been set, and further includes a system for resetting the value of the visual property;

a property group interface for defining a logical grouping of visual properties, the property group interface including an aggregate of property descriptors; and a property type interface, wherein the property type interface includes attributes selected from the group consisting of:

an underlying Java type that the visual property represents;
a second flag indicating whether the visual property is a hidden property;
a third flag indicating whether the visual property is a read-only property;
a fourth flag indicating whether the end user is an advanced user;
a fifth flag indicating whether the visual property represent a primitive Java type;
a sixth flag indicating whether the visual property is a required property;
a seventh flag indicating whether the visual property is a sensitive property;
a default value for the visual property; and
an enumeration of valid visual property values.

3. A computer-implemented method of implementing a user interface environment for consuming generic property descriptions from a third party and graphically displaying visual properties to an end user, comprising:

providing a set of environment independent interface definitions, comprising:

a property descriptor interface for providing a root interface for a description of any visual property defined by the third party, wherein the property descriptor interface includes attributes to define: a name of the visual property, a display name of the visual property, a description of the visual property, an identifier to indicate whether the visual property is enabled, and a bit flag for identifying a property type, by doing a bitwise comparison with predefined bit masks, the visual property describing how information is displayed and being at least one of a property of a visual element of a graphical user interface or a parameter associated with the visual element of the graphical user interface, a property change listener interface for defining a notification listener to listen to specialized property change events, a property interface for defining the visual property having a value that can be set, wherein the property interface defines a first flag that indicates whether the value of the visual property has been set, and further includes a system for resetting the value of the visual property, a property group interface for defining a logical grouping of visual properties, the property group interface including an aggregate of property descriptors, and a property type interface that includes attributes selected from the group consisting of:

an underlying Java type that the visual property represents;
a second flag indicating whether the visual property is a hidden property;
a third flag indicating whether the visual property is a read-only property;
a fourth flag indicating whether the end user is an advanced user;
a fifth flag indicating whether the visual property represent a primitive Java type;
a sixth flag indicating whether the visual property is a required property;
a seventh flag indicating whether the visual property is a sensitive property;
a default value for the visual property; and an enumeration of valid visual property values;

inputting a set of property definitions from the third party that conform to the defined interface definitions, wherein the set of property definitions are based on a set of abstract implementation classes;

processing the set of environment independent interface definitions; and graphically displaying visual properties based on the set of property definitions.

4. The user interface (UI) environment of claim 1, wherein the property change listener interface for defining the notification listener to listen to specialized property change events further comprises a property change event class.

5. The user interface (UI) environment of claim 4, wherein the property change event class defines a customized event, the customized event supports notification when a value of the visual property changes, when the visual property has been enabled, when the visual property has been disabled, when the enumeration of valid visual property values has changed, when a property group has a child property added, when the property group has a child property removed, when the property group has all of its contents replaced, and when the property group has all of its contents removed.

6. The user interface (UI) environment of claim 1, wherein the interface definitions further comprise:
 a single typed property interface;
 a single value property interface; and,
 a multi valued property interface.

7. The program product of claim 2, wherein the property change listener interface for defining the notification listener to listen to specialized property change events further comprises a property change event class.

8. The program product of claim 7, wherein the property change event class defines a customized event, the customized event supports notification when a value of the visual property changes, when the visual property has been enabled, when the visual property has been disabled, when the enumeration of valid visual property values has changed, when a property group has a child property added, when the property group has a child property removed, when the property group has all of its contents replaced, and when the property group has all of its contents removed.

9. The program product of claim 8, wherein the interface definitions further comprise:
 a single typed property interface;
 a single value property interface; and,
 a multi valued property interface.

10. The computer-implemented method of claim 2, wherein the property change listener interface for defining the notification listener to listen to specialized property change events further comprises a property change event class.

11. The computer-implemented method of claim 10, wherein the property change event class defines a customized event, the customized event supports notification when a value of the visual property changes, when the visual property has been enabled, when the visual property has been disabled, when the enumeration of valid visual property values has changed, when a property group has a child property added, when the property group has a child property removed, when the property group has all of its contents replaced, and when the property group has all of its contents removed.

12. The computer-implemented method of claim 11, wherein the set of environment independent interface definitions further comprise:
 a single typed property interface;
 a single value property interface; and,
 a multi valued property interface.

* * * * *